United States Patent
Brammall et al.

(10) Patent No.: US 6,265,973 B1
(45) Date of Patent: Jul. 24, 2001

(54) ELECTRONIC SECURITY SEAL

(75) Inventors: Terrence N. Brammall, Angola; Craig Hamilton, Waterloo; David L. Stevenson, Angola; Jeffrey Warner, Freemont; Stanley Gilbert, Angola, all of IN (US)

(73) Assignee: Transguard Industries, Inc., Angola, IN (US)

( * ) Notice: Subject to any disclaimer, the term of this patent is extended or adjusted under 35 U.S.C. 154(b) by 0 days.

(21) Appl. No.: 09/293,135

(22) Filed: Apr. 16, 1999

(51) Int. Cl.[7] .................................................. G08B 13/14
(52) U.S. Cl. ..................... 340/568.1; 340/539; 340/542; 70/38 A; 70/38 B
(58) Field of Search ................................. 340/539, 568.1, 340/571, 540, 541, 542; 70/38 A, 38 B (56) References Cited

U.S. PATENT DOCUMENTS

| | | | |
|---|---|---|---|
| 3,727,210 | * 4/1973 | Hawkins | ............................... 340/571 |
| 4,982,985 | 1/1991 | Atlas . | |
| 5,125,700 | * 6/1992 | Fattori | ................................... 292/318 |
| 5,127,687 | * 7/1992 | Guiler | ................................... 292/327 |
| 5,189,396 | 2/1993 | Stobbe . | |
| 5,347,689 | 9/1994 | Georgopoulos et al. . | |
| 5,413,393 | 5/1995 | Georgopoulos et al. . | |
| 5,450,657 | 9/1995 | Georgopoulos et al. . | |
| 5,479,160 | 12/1995 | Koelle . | |
| 5,485,154 | 1/1996 | Brooks et al. . | |
| 5,541,604 | 7/1996 | Meier . | |
| 5,582,447 | 12/1996 | Leon et al. . | |
| 5,587,702 | * 12/1996 | Chadfield | ............................. 340/542 |
| 5,656,996 | 8/1997 | Houser . | |
| 5,729,199 | 3/1998 | Cooper et al. . | |
| 5,736,924 | * 4/1998 | Shieh | ................................... 340/426 |
| 5,801,618 | 9/1998 | Jenkins . | |
| 6,069,563 | * 5/2000 | Kadner | ................................. 340/571 |
| B1 4,802,700 | 10/1996 | Stevenson et al. . | |

FOREIGN PATENT DOCUMENTS

| | | |
|---|---|---|
| 0574230A1 | 12/1993 | (EP) . |
| 2746944 | 10/1977 | (FR) . |

* cited by examiner

Primary Examiner—Jeffery Hofsass
Assistant Examiner—Anh La
(74) Attorney, Agent, or Firm—Carella Byrne Bain; John G. Gilfillan; William Squire (57) ABSTRACT

A molded transparent thermoplastic housing has a programmable transmitting circuit for transmitting seal identifying serial number, seal location, container identification and other data to a local receiver. A door in the housing permits access to the circuit for programming the seal indicia and related data for transmission. A contact arrangement forms a switch upon insertion of a locking bolt into a locking mechanism in the housing and applies battery power through the bolt to activate the data generating circuit. A conductor along the bolt shank is connected to the circuit provides a tamper evident signal to the circuit when the bolt is severed. The circuit senses the removal of the bolt or severed bolt condition for generating a "tamper" signal which is transmitted to a local receiver/reader. The conductor at the bolt may be a wire in a plastic tube surrounding the shank, a conductive layer over an insulation layer on the shank and over the conductive bolt head in ohmic contact with the head or a wire in a hollow metal tube. Severing the bolt severs the wire or the ohmic contact between the head and coating or between the head and the wire in the tube to indicate tampering. The seal periodically in random periods transmits the seal condition, whether normal or tampered. In an alternative embodiment, an interrogation unit may interrogate the seal which then transmits its locked or tampered states according to the locked or tampered condition of the bolt.

22 Claims, 7 Drawing Sheets

ELECTRONIC SECURITY SEAL

CROSS REFERENCE TO RELATED APPLICATION

Of interest is copending application Ser. No. 09/048381 entitled "A Pseudo Random Telemetric Data Communication System" filed Mar. 26, 1999 in the name of Yap Hwa Seng et al. and assigned to TriTech Microelectronics Ltd. and P-serv Technologies Pte. Ltd. and incorporated by reference herein in its entirety.

This invention relates to security seals of the type including a bolt and a locking body for securing a hasp, the seal including electronics for transmitting the locked and tampered states of the seal.

In the cargo industry, containers are widely employed. The containers have doors which are locked shut with hasps and secured with locking seals. Such seals include a steel bolt having a head and shank which is attached to a locking body having a shank locking mechanism. When the shank is inserted into the body, a locking collet or other arrangement permanently locks the shank to the body. For example, reference is made to commonly owned U.S. Pat. Nos. 5,005,883, 5,127,687, 4,802,700, 5,347,689, 5,413,393 and others for the disclosure of various seals of the type described.

Cargo containers are shipped via boat, train and truck. Hundreds of containers may be on a single boat. When the containers are unloaded they may be subject to tampering and vandalism. It is important that such tampering be immediately noted to preclude theft of valuable cargo. To assist in such theft and tampering prevention, prior art seals are assigned serial numbers. These seals are then assigned to a container and lock the assigned container. The serial number, container number, the carrier, and the location are then entered into a local computer manually. The entry then is manually made to show that the container is being shipped out of that location. Should a seal be tampered with, the event may be discovered at a different time and different location.

An electronic tagging device is commercially available that is programmable and which transmits information that is programmed, such as tagging identification serial numbers and other information as desired. This is referred to as radio frequency identification (RFID) which is well known in the art. Generally, an RFID tag will have a radio frequency (RF) transmitter, an RF receiver, an RF modulator, and a memory. The memory retains the digital code manifesting the identification number. The RF modulator extracts the digital code representing the identification number as a modulated signal which is applied to the RF transmitter. The RF receiver receives interrogation and control signals which manifest a request for the identification number.

Such systems provide security tagging for high value merchandise as it is transferred from the manufacturer to the consumer. Other applications include tagging of animals, humans and vehicles such as trucks and their cargo containers. Other applications include automatic toll collection systems.

Figure 19:
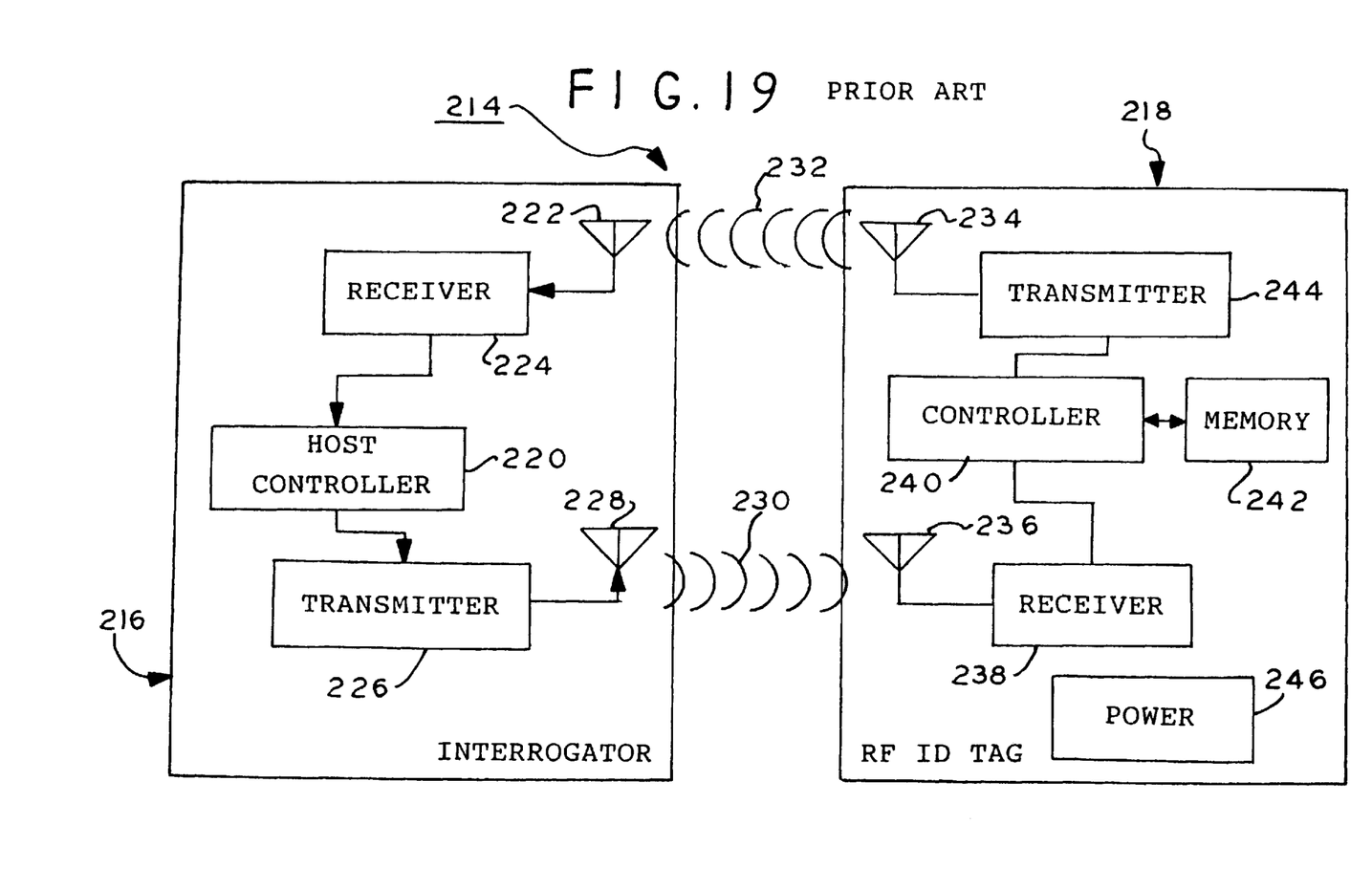
FIG. 19 is a block schematic diagram of a prior art RFID interrogation and tag system.

FIG. 19 illustrates a prior art RFID communication system 214. The system includes an interrogator 216 and an RFID tag 218. The interrogator 216 includes a host controller 220 to process received information from the RFID tag 218 via antenna 222 and receiver 224. To retrieve information from the RFID tag 218, the host controller 220 generates an interrogation command signal which is transmitted by transmitter 226 and antenna 228 as signal 230. The tag 218 transmits RFID signal 232 via antenna 234 in response to receipt of the interrogation command signal 230. The receiver 224 receives the signal 232 via antenna 222. The signal 232 manifests the identification number of the tag 218.

The RFID tag 218 has an antenna 236 and a receiver 238 to receive the interrogation command signal 230 from the interrogator 216. The receiver 238 transfers the received command signal to a controller 240. The controller 240 interprets the command and extract the corresponding identification number (ID) from memory 242. The extracted identification number is then transferred by the controller 240 to transmitter 244 which transmits the ID to antenna 234 which broadcasts the signal 232.

In active RFID tags, power 246 is provided by a battery system. In passive systems, the power is induced from the received signal. The signal 232 transmitted by the RFID tag 218 is modulated back scatter of the original signal transmitted by the interrogator 216.

The controller 240 may have an interface, not shown, to receive data from external transponders such as temperature sensors, pressure sensors, global positioning sensing and other telemetric measurement data.

When multiple RFID tags 218 are simultaneously in close proximity to the interrogator 216 and the interrogator is broadcasting interrogation and control signals, the RFID tags may simultaneously respond. The responses may collide and the identification codes may be garbled and lost. Generally, the interrogator will rebroadcast commands to establish an order of broadcast of the RFID tags. This ordering of the broadcast is possible only from active RFID tags.

U.S. Pat. No. 5,479,160 to Koelle, incorporated by reference herein, provides an inexpensive circuit that consumes low power, can detect low level RF signal and RF signals of varying strength, and can reject intermittent low level RF interference. Logic circuitry is provided to insure that the read/write circuitry of the tag will not be activated unless the polarity of the reactivation signal is detected for a specified time.

U.S. Pat. No. 5,541,604 to Meier, incorporated by reference herein, allows the use of a single set of circuitry in each of the interrogator and the transponder for transmission and reception of both powering and communication signals ;without the need for synchronization between interrogators. PWM (pulse width modulation), PPM (pulse position modulation and FSK (frequency shift keying) transmission systems are disclosed.

U.S. Pat. No. 5,485,154 to Brooks et al, incorporated by reference herein, encompasses systems and methods of communicating with or identifying more than one remote device employing random sequence selection of a carrier signal frequency from a defined set of carrier frequencies. The remote device selects a carrier signal frequency and transmits data such as an identification code using that frequency and then reselects the same or a new carrier signal frequency for the next transmission event.

The aforementioned copending application provides a communication system that allows multiple transmitters of telemetric data to communicate with an interrogating receiving system and is incorporated in the present invention circuit.

However, there are no mechanical seals of the type described in the aforementioned seal patents or copending application for use with such electronic tagging devices presently available. The present inventors recognize a need for such electronic tagging circuits for use with bolt seals to resolve a long felt problem in the cargo shipping field.

An electronic seal according to the present invention comprises a housing having a cavity that receives a bolt that has an elongated shank and a head. Signal generating means are in the cavity. Bolt locking means receive and lock the shank to the housing. Circuit means in the cavity are responsive to the received locked shank for causing the signal generating means to generate a first signal manifesting a first code and a locked seal and a second signal manifesting a second code and a tampered condition when the shank is severed.

In one aspect, an electrical conductor completes a circuit with the circuit means and extends along a length of the shank.

In a further aspect, an electrically insulated tube extends from and is locked to the cavity for receiving the shank therein, the tube including the conductor therein.

The conductor preferably extends adjacent to the head from the cavity, the tube for moisture sealing its interface with the bolt.

In a further aspect, the bolt is electrically conductive, the conductor including the bolt, an electrical insulator about the shank and an electrically conductive layer over the insulator, and contact means for electrically connecting the layer to the circuit means.

The housing preferably includes an opening for receiving means for programming the circuit means with seal identifying data, the housing including a door for selectively closing the opening, the door including a bolt receiving recess for locking the door closed in response to the received locked shank engaged with the recess.

In a still further aspect, the circuit means includes contact means for engaging the received locked shank for electrically coupling an electrical power source to the circuit means, further including conductor means extending along the shank for completing a circuit to and with the circuit means.

In a further aspect, the bolt is electrically conductive, the conductor means comprising at least one conductor and the bolt cooperating with the conductor to complete a circuit with the circuit means.

Preferably, contact means are responsive to and ohmically coupled to the insertion of the shank into the cavity for applying electrical power to the circuit means.

In a further aspect, an electrical conductor extends along the shank and is coupled to the circuit means for completing a circuit with the circuit means, the circuit means for causing transmitting means to transmit the second code after the conductor is severed.

The bolt locking means preferably comprises a body secured in the cavity, an annular recess in the body and an annular ring segment in the recess, the shank including a groove for engaging the ring segment for locking the shank to the body.

The circuit means preferably includes means for causing the second code to be generated upon interruption of the applied electrical power.

The contact means preferably comprises a support, a first contact on the support and a resilient second contact secured to the support releaseably engaged with the received shank and ohmically connected to the first contact.

Preferably the second contact is serpentine and is preferably S-shaped.

The circuit means in a further aspect includes a circuit comprising a first contact for ohmically engaging the shank, the shank being electrically conductive, the bolt including an electrically insulated layer over the shank adjacent to the head and extending along the shank within and external the cavity and an electrically conductive layer over the insulated layer and ohmically engaged with the shank, the circuit including a second contact for ohmically engaging the conductive layer for applying a signal to the circuit means, the engagement of the shank with the first and second contacts for activating the circuit means to generate the first code, the interruption of the electrical circuit at either of the contacts for causing the circuit means to generate the second code.

The seal in a further aspect includes transmission means for transmitting the first or second signals.

The seal in a further aspect includes means responsive to an applied input signal for causing the transmission of the first and second signals.

IN THE DRAWING:

FIG. 1 is a top plan view of an electronic security seal according to an embodiment of the present invention;

FIG. 1a is an exploded isometric view of the seal of FIG. 1;

FIG. 2 is an exploded isometric view of a portion of the seal of FIG. 1a;

FIG. 3 is an isometric view of a battery terminal used in the seal of FIG. 1a

FIG. 6 is an end sectional elevation view of the seal of FIG. 1 taken along lines 6—6;

FIG. 7 is a sectional side elevation view of the bolt locking body employed in the embodiment of FIGS. 1 and 1a;

FIG. 9 is a sectional side elevation view of a bolt according to a second embodiment of the present invention;

FIG. 10 is a plan view of a circuit board employed in the embodiment of FIG. 1a;

FIG. 12 is a side elevation view of an insulator-conductor assembly employed in the embodiment of FIGS. 1 and 1a;

FIG. 14 is a schematic block diagram of a circuit and fragmented sectional side elevation view of a bolt for use with the circuit according to the embodiment of FIGS. 1 and 1a;

Figures 1, 14:
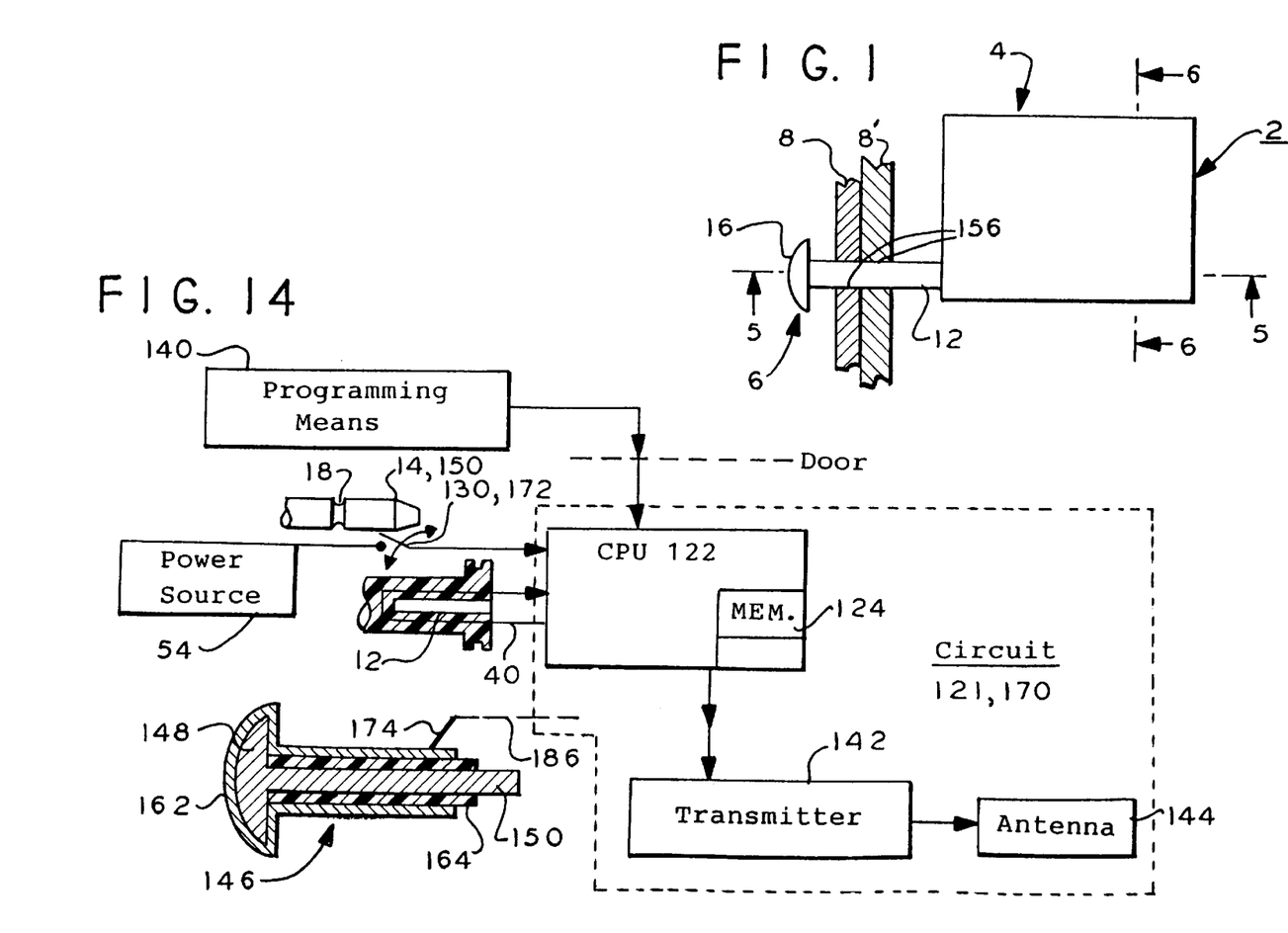

In FIG. 1, electronic seal device 2 according to the present invention includes a seal 4 and a bolt assembly 6 locked to the seal 4. The bolt assembly 6 locks hasps 8, 8' together. The hasps 8, 8' may be part of a cargo container (not shown), for example, for locking the container door shut.

Figures 1A, 3:
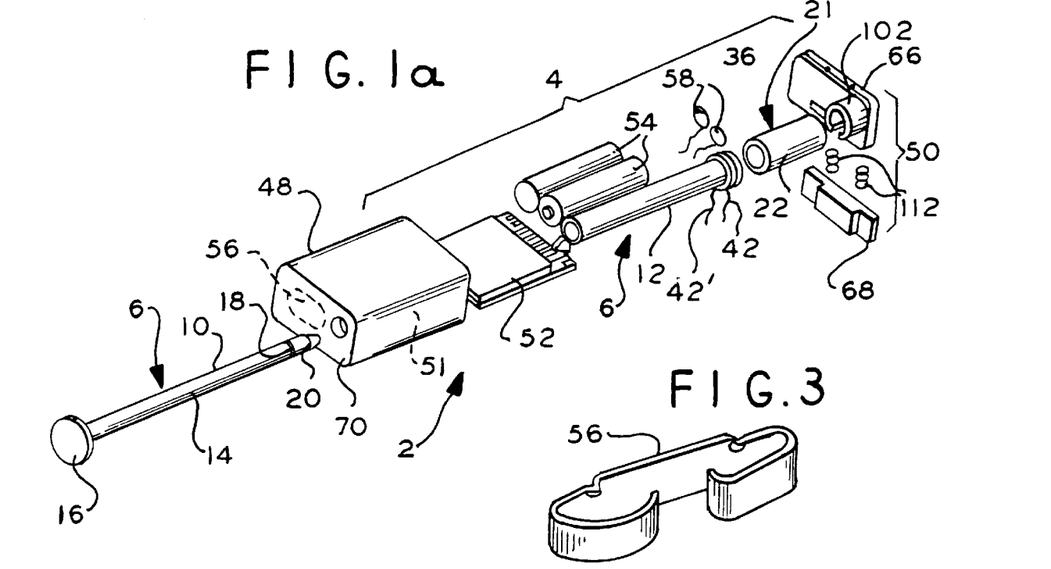

In FIG. 1a, The bolt assembly 6 in one embodiment comprises a steel bolt 10 and electrically insulating thermoplastic tube 12. Bolt 10 comprises a shank 14 and a head 16. The head and shank are a one piece metal structure and are electrically conductive as a single conductor. An annular locking groove 18 is in the peripheral surface of the shank 14 adjacent to the shank tip 20 distal the head. The bolt 10 is conventional and is, for example, for use with a bolt locking body as disclosed in the aforementioned U.S. Pat. No. 4,802,700 incorporated by reference herein in its entirety. The seal structure disclosed in this patent is by way of example and other seal structures employing bolts and locking bodies as disclosed in others of the aforementioned patents in the introductory portion or as otherwise know in this art may be employed in the alternative.

Figures 5, 8:
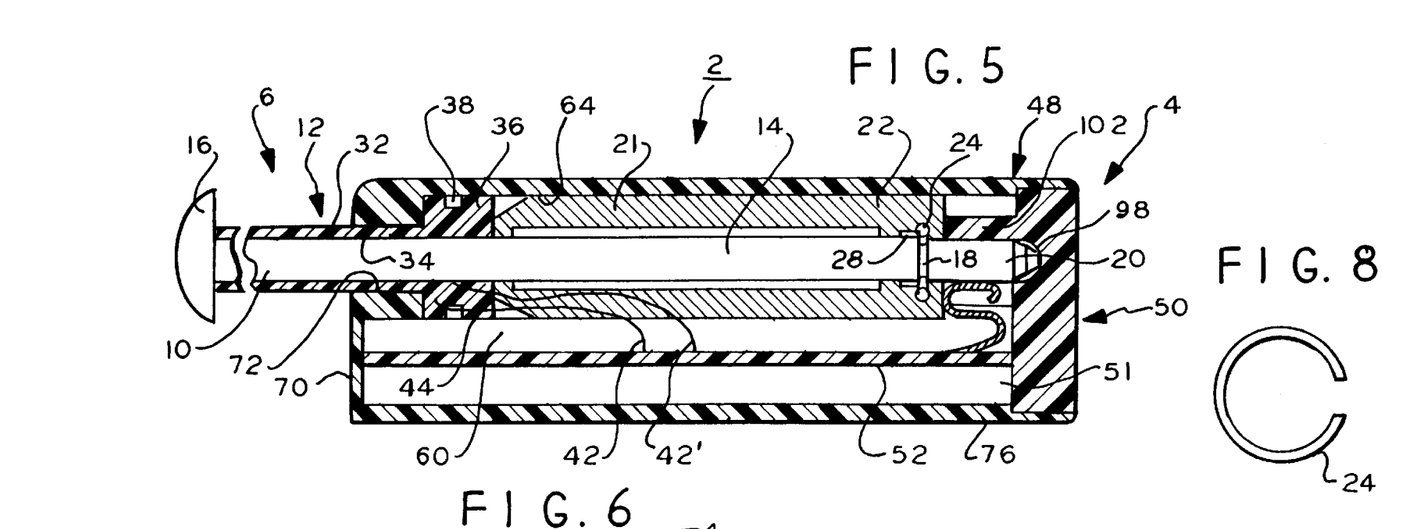
FIG. 5 is a side sectional elevation view of the seal of FIG. 1 taken along lines 5—5.
FIG. 8 is a side elevation view of a spring used in the body of FIG. 7.
Figures 6, 7:
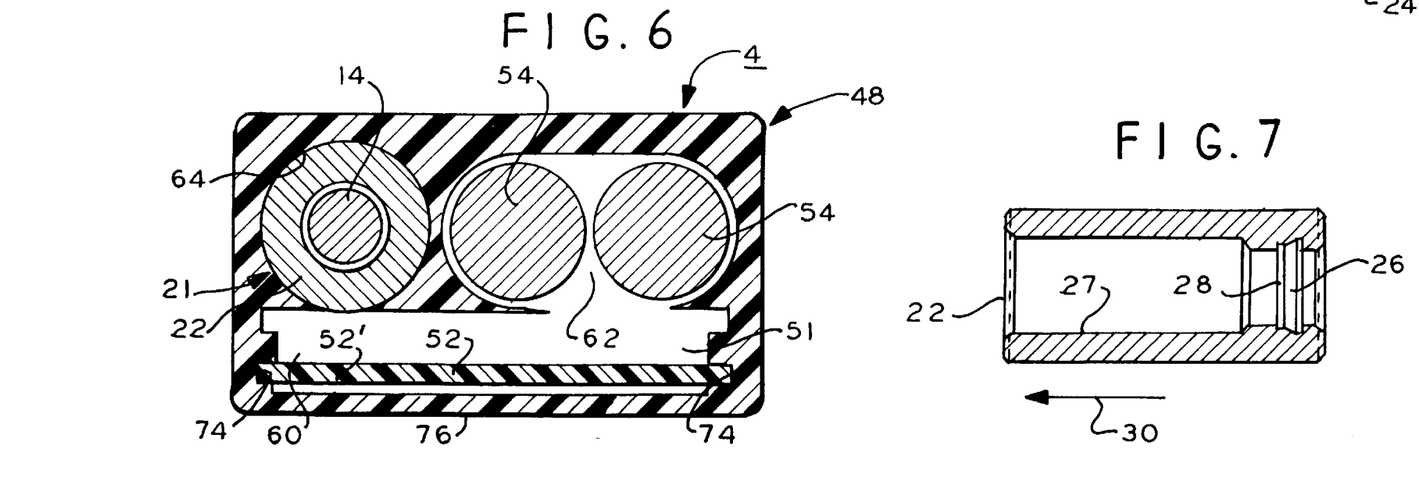

In the present embodiment, the bolt 10 is used with a locking mechanism 21 comprising a body 22, FIG. 7 and a partial spring steel ring 24, FIG. 8. The ring 24 is received in internal annular stepped groove 26 in the locking body 22 which also has a longitudinal bore 27. The groove 26 has an enlarged tapered section and a smaller diameter cylindrical portion. The ring 24 in the groove 26 expands in the tapered section as the bolt shank is inserted. The ring 24 then becomes aligned with the groove 18 in the bolt shank 14 and returns to its quiescent diameter by compressing partially into the shank groove. When the bolt is attempted to be unlocked by retracting it in direction 30 in FIG. 7, for example, the ring is compressed further into the groove 18 of the bolt by a smaller diameter step 28 in the body groove 26. The step 28 in the body groove 26 and the bolt 10 groove 18 cooperate to lock the bolt to the body 22 to preclude further withdrawal of the bolt from the body 22 bore 27.

Figure 12:
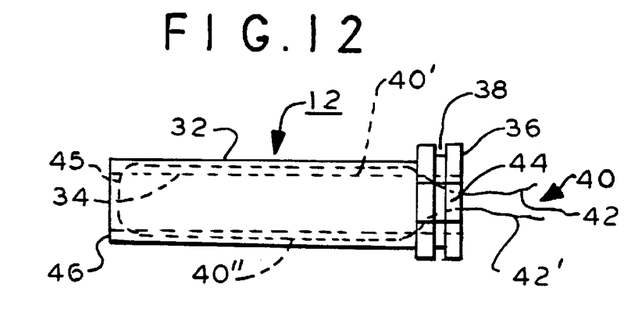
Figure 13:
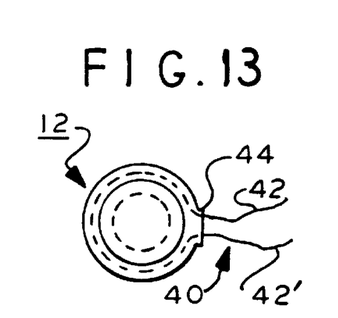
FIG. 13 is an end elevation view of the assembly of FIG. 12.

In FIGS. 1a and 12, the bolt assembly 6 also includes a thermoplastic tube 12 made of relatively stiff hard plastic material such as vinyl and the like. The tube 12 has an elongated tubular body 32 with a bore 34. The bore 34 closely receives the bolt shank 14, FIG. 5. The body 32, FIG. 12, terminates at one end in an enlarged radially outwardly extending annular bifurcated flange 36 having an annular groove 38. A wire electrical conductor 40, e.g., copper, is embedded within the tube 12. The conductor 40 has terminal ends 42, 42' protruding from the tube 12 at raised boss 44 radially extending from the tube flange 36. The conductor 40 extends along the axial length of the tube 12. One portion 40' of the conductor extends from end 42 linearly along one side of the tube 12 . A semi-annular conductor portion 45 circumferentially extends about the tube 12 at end 46 distal the flange 36 for about 180°. A second portion 40" extends axially on the opposite side of the tube 12 as portion 40' terminating at end 42'. The portions 40' and 40" may also circumscribe the tube in the alternative, as they progress from ends 42, 42' to the annular portion 45.

The tube 12 bore 34 is dimensioned to closely receive the bolt shank 14. The tube end distal the flange 36 abuts the bolt head 16 and the bolt shank 14 to form a fluid tight seal at the interface therebetween to preclude moisture from penetrating the interface.

In FIGS. 1a, 2, 5 and 6, the seal 4 comprises a preferably molded transparent thermoplastic housing 48 and an end rear wall assembly 50. The housing 48 and assembly 50 together form an interior chamber 51, having sub-chambers 60, 62 and 64. A printed circuit board assembly 52 is in chamber 60, a pair of batteries 54, a battery end contact 56 (FIG. 3) and battery contacts 58 are in sub-chamber 62. The lock mechanism 21 and tube 12 flange 36 are in sub-chamber 64.

Figure 2:
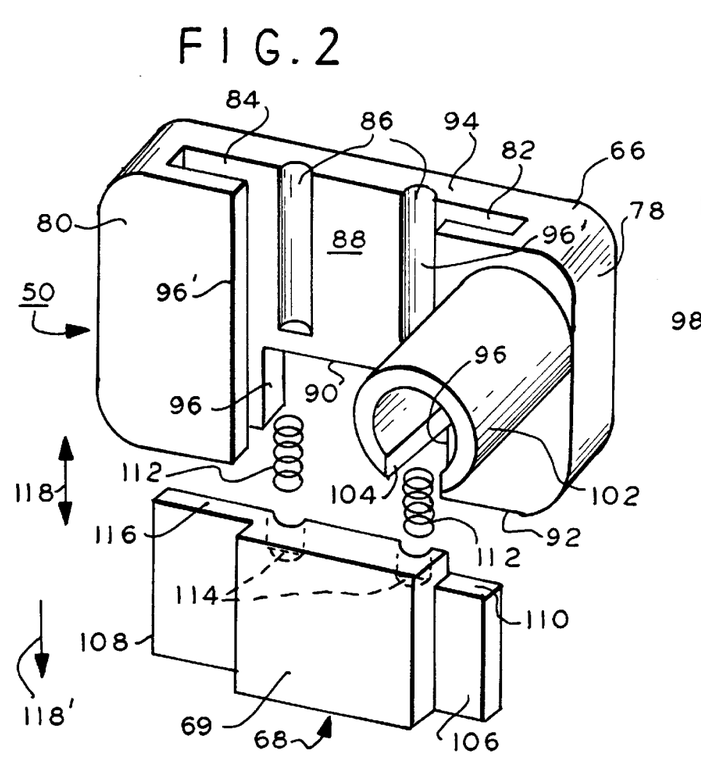

The wall assembly 50 comprises a molded transparent thermoplastic fixed wall 66 and a separate thermoplastic molded movable door 68. The wall 66 is permanently secured to the interior sides of the housing 48 by ultrasonic welding, heat welding or adhesive bonding or any other fixation process according to a given implementation.

In FIG. 5, the tube 12 flange 36 abuts the housing front wall 70 and is locked fixed in place by the abutment of the lock mechanism 21 body 22, which may be press fit into generally circular cylindrical chamber 64 and abuts the flange 36. Body 22 abuts tubular member 102 (FIG. 2). A bore 72 is in the front wall 70 for receiving therethrough the tube 12. The front wall 70 is thicker at the flange 36 in the bore 72 to reinforce this portion of the housing 48. The wall assembly 50 locks the tube 12 and locking mechanism 21 in the housing cavity.

A pair of slots 74, FIG. 6, are in chamber 60 in opposite side walls of the housing 48 for slidably receiving the printed circuit board 52' of assembly 52. The board 52' overlies the wall 76 of the housing for the full extent of the wall 76 and is locked in place by the front wall 70 and rear wall assembly 50.

Figure 4:
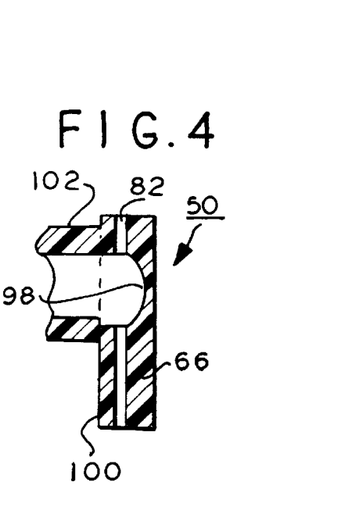
FIG. 4 is a sidle elevation sectional view of a component of FIG. 2.

Rear wall assembly 50 fixed wall 66, FIGS. 2 and 4, is generally rectangular preferably molded transparent thermoplastic. Wall 66 fits snugly within the housing 48. The wall 66 has opposing mirror image U-shaped end portions 78, 80. The portions 78 and 80 each have opposing aligned slots 82 and 84, respectively. A pair of parallel arcuate elongated recesses 86 are in a face 88 of wall 66. A rectangular opening 90 is formed in wall 66 adjacent to the recesses 86 and terminating at wall edge 92. The recesses 86 terminate in communication with the opposite wall edge 94. The recesses 86 are intermediate the slots 82 and 84. The opening 90 is defined by facing spaced edges 96 in wall 66 coextensive with the edges 96' of the portions 78 and 80. The edges 96 taper somewhat in opposite directions away from opening 90 to serve as a lead in for a programming unit (not shown).

In FIGS. 2 and 4, wall 66 portion 78 has a circular in plan view concave recess 98 for receiving the convex circular in section tip 20 of the received locked bolt shank 14. The recess 98 extends into the wall 66 from the interior face 100 extending past the slot 82. In this way, the received bolt tip 20 passes through and blocks the slot 82. A tubular member 102 extends from wall 66 into the chamber 64 coextensive and concentric with the chamber 64 which is generally circular cylindrical. The tubular member 102 has a longitudinally extending slot 104. The bore of member 102 receives the locked tip end of the received bolt shank 14 for aligning it with the recess 98.

Door 68 has a central section 69 and a reduced thickness pair of opposite wing sections 106, 108 which fit into and slide within the respective slots 82 and 84 of wall 66. Section 106 has a shorter length than section 108 to form a shoulder 110. The shoulder 110 abuts or may be closely spaced from the received tip 20 of the received bolt shank 14. A pair of compression springs 112 are received in grooves 114 in the side of the central section 69. The grooves 114 extend partially into the section 69 from door edge 116. The springs are also received in the recesses 86 of the wall 66. With the door 68 mounted in slots 82 and 84, the door slides in directions 118. The springs 112 urge the door 68 in direction 118' to close the opening 90.

Figures 9, 10:
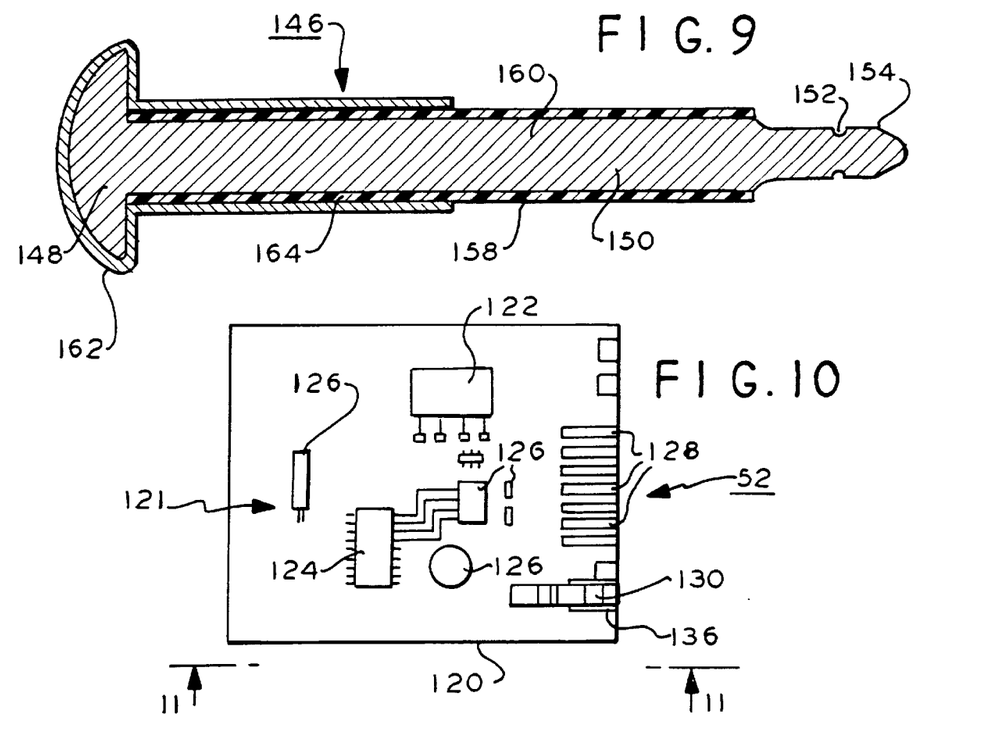
Figure 11:
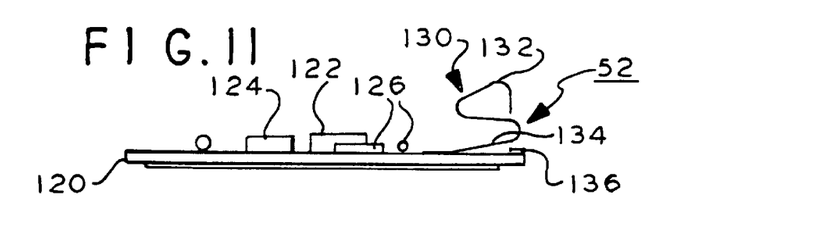
FIG. 11 is a side elevation view of the board of FIG. 10 taken along lines 11—11.

In FIGS. 10 and 11, printed circuit board assembly 52 comprises a circuit board 120 with a programmable circuit 121 comprising a CPU 122, a computer processing unit, memory 124 and other circuit components 126 such as crystals, capacitors and resistors for providing a programmable transmitting RFID tag circuit similar to the circuits of FIG. 19, or certain of the patents noted in the introductory portion incorporated by reference herein and modified as described herein. The board 120 has contacts 128 for receiving a programming portable unit (not shown) for programming the circuit 121 with a seal identification code, i.e., a unique number assigned a particular seal, geographic location where the seal is being deployed, container identification, e.g., a unique number assigned to a cargo container, the shipping carrier for the container, the container port of origin, container destination, inventory of the container and other data. Such a programming circuit is within the skill of one of ordinary skill in the computer programming art. The circuit 121 is connected to the conductor 40 terminal ends 42 which completes the circuit.

A resilient contact 130, e.g., beryllium copper, is on the board 120 and connected to the circuit 121 for providing electrical battery power to the circuit by closing an ohmic connection between the circuit 121 and the batteries. The contact 56, FIG. 3 provides a serial connection to opposite polarity terminals of the batteries 54. The contact 130 is S-shaped with a bent contact leg 132 for engaging the shank 14 during insertion and locking of the bolt and after the bolt is locked. The contact 130 is mounted on the board 120 with a second leg 134.

The contact 130 is ohmically connected to the circuit 121. A further contact 136 on the circuit board 120 is connected to the batteries to complete the circuit between the batteries and the circuit 121. The circuit 121 is also connected to a second battery contact 58. When the shank 14 is received in the seal 4, the shank depresses the contact 130 into electrical ohmic connection with contact 136, FIG. 11. This arms the circuit. Subsequent interruption of a signal in the circuit 121 by breaking the conductor 40 is sensed by the circuit 121 in a sensor portion. This changes the codes in the circuit and causes the generation of a "tamper" signal, i.e., a second code. The tamper signal may be the word "tamper" which is generated and transmitted instead of the normal signal or first code. Power is supplied to the circuit 121 after the bolt is inserted by closure of the engaged contact 130. The circuit 121, FIG. 14, is a programmable RFID tag circuit including a controller comprising CPU 122 and memory 124, e.g., an EPROM, an electronically programmable ROM, which is programmed by the portable programming unit forming the programming means 140 and other memory such as a ROM and so on. The circuit 121 may include the circuit elements of the circuit of FIG. 19 and further including the programmable EPROM. The circuit 121 includes a transmitter 142 and a transmission antenna 144. Transmitter 142, once energized by the insertion of the bolt, transmits the encoded signal intermittently at random time intervals, for example, in the range of 1–10 seconds, and which may be conventional. The circuit 121 includes a programmable arrangement for programming a given ID, the first code or normal signal.

The depicted circuit includes two embodiments. The bolt 10 with tube 12 is shown connected to the control means of circuit 121 by solid line conductors. The bolt 146 of FIG. 9 (or bolt 190 of FIGS. 17 and 18) in a second embodiment has the head and electrically conductive layer portion thereof shown connected to the circuit 121 by dashed lines to illustrate an alternative embodiment. The shank tip shown represents both embodiments.

The ID information discussed above is programmed into the circuit 121 by the portable programming unit, programming means 140. Programming and manufacturing such a programming unit is within the skill of one of ordinary skill in this art. Once the circuit 121 is energized, the circuit 121 begins transmission of the data, previously programmed into the circuit, via transmitter 142 or in the alternative, selectively in response to interrogation in a different embodiment. This data includes a first code manifesting the serial number of the seal device 2 and other data noted above. This data preferably is transmitted periodically every few seconds at random intervals, for example, or upon interrogation, in the alternative. The batteries are permanent and have a life sufficient for this purpose for the anticipated life of the seal device 2.

Figure 14A:
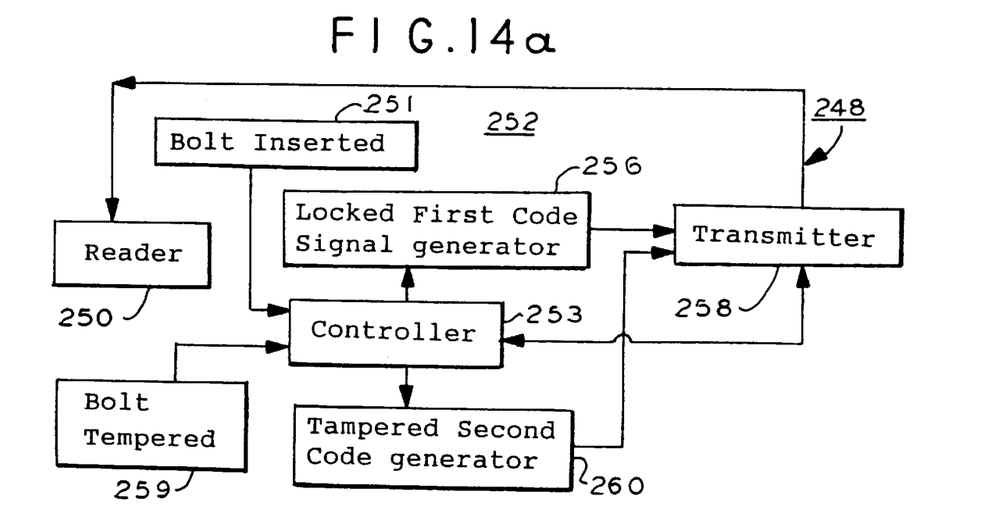
FIG. 14a is a schematic block diagram of the diagram of FIG. 14 in more detail.

In FIG. 14a, in system 248, a locking bolt is inserted, reference numeral 251, into the seal. This activates the controller 253 which causes the first code signal generator 256 to generate a first code manifesting a locked seal. The transmitter 258 through the controller 253 transmits the first code to a reader 250, which may be conventional. The reader includes an antenna, a receiver and a circuit for decoding the received signal and converting it to the desired data for further transmission or display.

If the circuit is interrupted, FIG. 14, e.g., by severing the conductor 40 in the tube 12, the program of circuit 121 is programmed by the program in the memory 124 to immediately sense this condition. Electrical power is applied to the circuit at all times while the bolt is inserted. The circuit 121 will transmit automatically or, in the alternative in a different embodiment, upon interrogation, via transmitter 142, FIG. 14, a new code manifesting a tampering condition to the reader 250.

In FIG. 14a, the interruption of the circuit 121 by a tampered bolt 259 is sensed by the controller 253 which immediately causes the generation of the second code by generator 260 and disables the first code generation. Reader 250 reads the seal data transmitted by transmitter 258 under control of the controller 253.

Antenna 144 comprises a wound wire coil on the rear surface of the board 120. The antenna may be covered by a label with the unique serial number. This number is visible through the housing 48, which is transparent in this example, and which is the serial number programmed into the circuit 121.

The program of circuit 121, in response to momentary interruption of power, or interruption of the circuit 121 by severing the conductor 40, is programmed to transmit the message "tamper." The reader 250, FIG. 14a, which may be hand held or permanently installed, adjacent to a conveyer of the cargo container or roadway for a trailer truck, receives the transmitted signal. The reader is coupled to a local, but remote computer (not shown). The tamper signal from the reader is forwarded to the computer which also indicates this state with a display and may be programmed to set off an audible and/or visual alarm also or in the alternative. This alarm is immediate and the transmitted signal immediately identifies the seal and the container that has been tampered with. The tampering is noted at a given container location by reading the transmitted signal at different shipping and receiving points.

In operation, the seal device 2, FIG. 1a is assembled without the bolt 10 attached or with the bolt temporarily attached exterior the housing 48 within the tube 12. The seal at this time has no identifying serial number programmed into the circuit 121. However, the unique serial number is visible through the housing 48 on a label on the back of the circuit board 120. The seal 4 is then assigned a container (or door etc.) to be secured. A programming unit (not shown) is inserted through the door 68, FIG. 1a, opening 90 (FIG. 2). The programming unit is engaged with the contacts 128, FIG. 10 of the circuit 121. The unit then programs the unique data associated with this seal. The programming unit is then removed and the door 68 automatically shuts in response to the springs 112.

At this time the bolt 10 shank is inserted fully into the tube 12 of the programmed device 2 until the bolt head 16 abuts the tube 12 end 46, FIG. 12. This seats the bolt shank 14 tip 20 into the recess 98 in the wall 66 of rear wall assembly 50 and within the bore of tubular member 102 attached to the wall 66. The seated shank tip locks the door 68 shut so that the circuit 121 program can no longer be changed. The bolt is permanently locked to the locking mechanism and can not be removed without destroying the bolt or seal 4.

The insertion of the shank 14 closes the switch formed by contact 130, FIG. 14, powering the circuit 121 and activating it. A signal is applied to and passes through the conductor 40 to and from the circuit 121. This circuit 121 is programmed to sense the presence of this signal to show the tamper state of the seal. The circuit 121, once powered on, is armed and will transmit the programmed seal identification and related data to a local interrogator/receiver (not shown) upon interrogation.

Assume the bolt 10 shank 14 is severed in order to open the seal device 2. This severs the conductor 40. The severing of the conductor 40 interrupts the signal supplied to and from the circuit 121. The circuit 121 program senses this interruption and is programmed to change the programming to note the tampered condition. This condition is transmitted by transmitting the word "tamper" and/or a change in serial number and/or an alarm condition. When the alarm condition is read by reader 250, the integrity of that container has been breached. The reader 250 also stores the seal number of each seal that has been breached. This information is manually read from the reader 250.

If a number of signals are being transmitted in close proximity, then the signals are distinguished by a signal separation circuit. For example, a circuit as disclosed in the aforementioned copending application incorporated by reference herein may be used or other known circuits as described in the introductory portion may be used.

If an attempt is made to pull the bolt out of the seal 4 and reprogram the circuit and then reinsert the bolt, the circuit 121 senses this and transmits "tamper." Any attempt to cut or sever the tube 12 causes a "tamper" signal to be generated. The tamper signal is repetitively transmitted. Thus it is important that no interruption of the circuit occurs once the circuit is powered on and armed. Thus it is important that the contact 130 be arranged to provide positive ohmic connection to preclude any accidental interruption of power or signal to the circuit 121. It is important that the contact 130 not disengage due to shock loads such as dropping and rough handling of the attached container. Contact 130 withstands such shock loading.

In FIG. 9, a second embodiment of a seal comprises a bolt 146 having a head 148 and a shank 150. The bolt shank 150 has a reduced diameter tip 154 in which annular groove 152 is formed. Groove 152 may be identical to groove 18 in the bolt 10, FIG. 1a, and serves the same purpose. The shank 150 is larger in diameter than the shank 14 of the bolt 10. The hasps 8, 8', FIG. 1, of containers have a maximum size bolt receiving openings 156. Therefore, to accommodate the tube 12 of the FIG. 1 embodiment, the shank 14 of the bolt 10 is reduced in diameter accordingly. To make a more tamper resistant bolt requires the shank to be larger in diameter. Due to the limitation of the hasp aperture diameter, to make the shank larger requires eliminating the tube 12.

In the bolt embodiment of FIG. 9, the tube 12 is not required. In its place a relatively thinner electrical insulating coating layer 158, e.g., thermoplastic material, is deposited over the shank 150 for the length of the larger diameter portion 160 for a given distance from the bolt end. The layer 158 extends for the length of the shank portion 160 and abuts the head 148. A conductive coating layer 162 is deposited over the head in electrically conductive ohmic contact with the electrically conductive metal head 148. The coating layer 162 is also deposited over a portion 164 of the insulating layer along a length of the shank 150 for a given distance from the bolt end. The layer 162 may extend to about medially the length of the shank 150. Such insulating and electrically conductive coatings are commercially available and need not be provided in detail herein. The insulating and conductive coatings are significantly thinner than the tube 12. For example, the tube 12 may have a wall thickness of about 1.5 mm thick as compared to a thickness of about 0.01–0.05 mm for each of layers 162 and 164.

Figure 15:
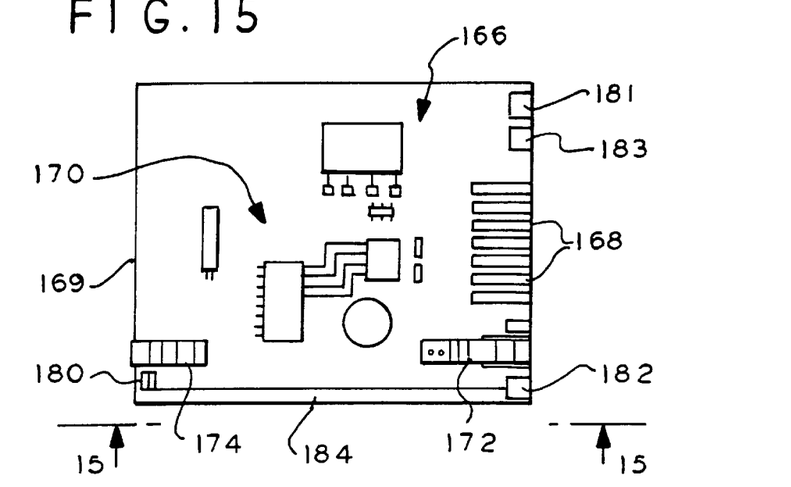
FIG. 15 is a plan view of a circuit board employed in second embodiment.

In FIG. 15, circuit board assembly 166 includes contacts 168 on printed circuit board 169 for receiving the mating contacts of the programming unit as discussed above. The circuit 170 on the board 169 may be substantially the same as the circuit 121 on the board assembly 52 of FIG. 10. In this case, the assembly 166 includes two spaced electrically isolated contacts 172 and 174 each of which is S-shaped and substantially the same in construction as contact 130, FIG. 10. The contacts 172 and 174 are mounted on the board 169. A connector 180 on the board 169 is ohmically connected to contact 174 and is ohmically connected to contact pad 182 by conductor 184. Conductor 184 is connected to circuit 170 via pad 182 by other conductors not shown. Pads 181 and 183 are coupled to positive and negative voltage sources, respectively. Pad 183 is coupled to contact 172 and pad 181 is coupled to the circuit 121. The ohmic connection of contacts 172 and 174 completes the circuit 170.

When the bolt 146 is attached to the seal, the tip 154 region ohmically engages the contact 172 and the bolt electrically conductive layer 162 ohmically engages the contact 174. Contact 174 is ohmically connected to conductor 184 which in turn is ohmically connected to pad 182 and then to circuit 170. This couples the circuit 170 (FIG. 15) to the power source 54, FIG. 14. The coupling of the circuit 170 to the bolt 146 by contact 174 is shown by the dashed line 186 in FIG. 14. A power signal from the power source is applied to the circuit 170 via the bolt 146 via the coating layer 162 at contact 174 and the electrically conductive shank 150 at contact 172. The layer 162 is ohmically connected to the shank at the head 148 which has no insulating layer. The circuit tampering sensing power signal passes through the bolt via contact 172 at the bolt tip 154 and the contact 174 at the layer 162.

If the bolt 146 is cut to break the seal, the coating layer 162 is severed and the circuit broken because the head, connected ohmically to the coating layer 162, is severed from the shank and the contact 174 is no longer ohmically connected to the contact 172. Thus there is no ohmic connection between the layer 162 and the shank 150 in the severed bolt once the head is removed.

Figure 17:
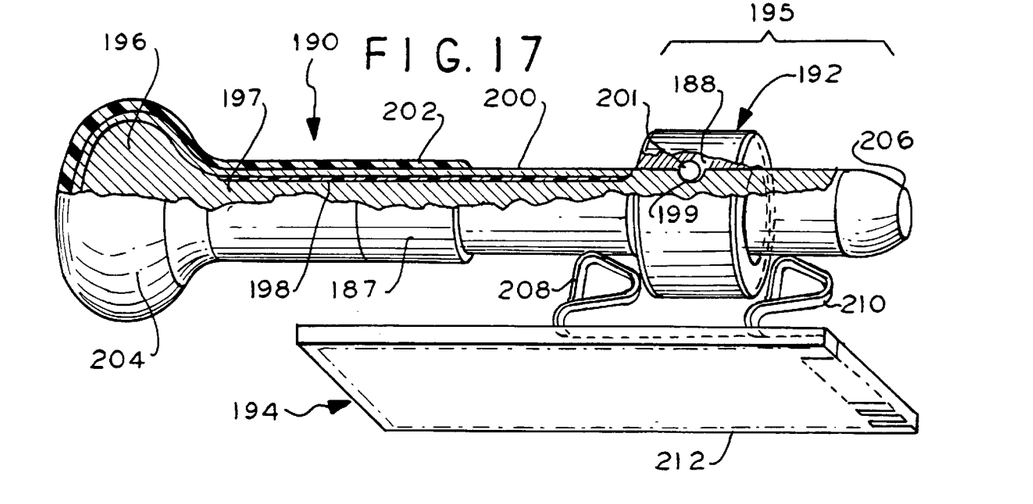
FIG. 17 is a perspective view of a further embodiment of a bolt, seal and contact arrangement of a seal according to the present invention.
Figure 18:
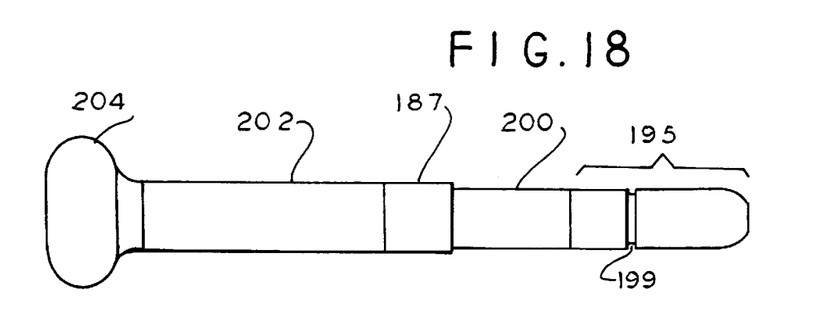
FIG. 18 is a side elevation view of the bolt of FIG. 17.

In FIGS. 17 and 18, a further embodiment of a bolt and locking seal arrangement is disclosed including a bolt assembly 190, a locking body 192 secured to a housing such as housing 48, FIG. 1a, and a circuit and circuit board assembly 194. The bolt assembly 190 comprises a steel bolt 196, an insulating powder coating 198, a conductive paint coating 200 and a thermoplastic outer layer 202. The bolt 196 may be about 3.75 inches (9.5 cm) long and 0.312 inches (7.9 mm) diameter with a spherical or other shaped head 204 at one end.

The bolt shank 197 may be under cut slightly in the shank region receiving the coatings 198 and 200 to keep the shank diameter at a minimum for use with hasps as discussed above. The bolt head and shank are initially entirely coated with a rust and oxidation prevention electrically conductive coating (not shown) as known in the metal working art. A commercially available powdered electrically insulating coating 198 is deposited over most of the bolt shank in the undercut region, e.g., starting about one inch from the narrowing tapered end 206 spaced from the locking groove 199 toward the head 204 and terminating at the base of the head 204. The exposed bolt region 195 only has the oxidation prevention coating and includes the locking groove 199 which receives the locking ring 201. The body 192 has a stepped groove 188 for receiving the ring 201 as described above. The coating 198 is about 0.002–0.003 thick. The coating maybe any commercially available insulating material such as thermoplastics and the like.

The electrically conductive paint coating 200 is deposited over the coating 198 and may be about 0.002–0.003 inches thick (0.05–0.08 mm). The coating 200 is also deposited over the head 204 in electrically conductive contact with the bolt 196 head. The region 195 is thus electrically conductive as exposed. The shank 198 and head 204 are coated with an electrically insulating thermoplastic layer 202 preferably about 0.031 inches (0.8 mm) thick. The layer 202 has a tapered region 187. This tapered region permits the bolt to be more easily inserted into a seal such as seal 4, FIG. 1. The layer 202 terminates in this example about 1.625 inches (4.1 cm) from end 206. This leaves about 0.626 inches (16 mm) of electrically conductive coating 200 exposed. The layer 202 may be applied by injection molding. The layer 202 serves as a moisture seal with the housing such as housing 48 when the bolt assembly is inserted into the seal housing protecting the interior components from moisture.

The circuit board assembly 194 has two spaced contacts 208 and 210 secured to board 212. The locking body 192 in the assembled state is spaced from and between the contacts 208 and 210 and does not engage the contacts 208 and 210. Electrical connection of the contacts 208 and 210 by the switch action of the connection formed by the inserted bolt 196 electrically conductive regions applies power to the transmission and control circuit on the board 212 as discussed above with the other embodiments. The contact 210 ohmically engages the shank 197 exposed region 195. The contact 208 ohmically engages the electrically conductive coating 200. Coating 200 is ohmically engaged with the shank 197 through its ohmic engagement with the head 204. Since coating 200 is insulated from the shank 197 along the shank length no direct electrical ohmic engagement is made in this region by the contact 208 to the shank 197 in this region.

In operation, the bolt assembly 190 is inserted through the mating hasp 8, 8', FIG. 1 and into the housing such as housing 48 sub-chamber corresponding to sub-chamber 64, FIG. 6. As the assembly 190 is inserted, the shank 197 tip region 195 adjacent to end 206 ohmically engages the contact 210, FIG. 17. When the shank 197 is fully inserted the groove 199 engages and locks to the locking ring 201 in the locking body 192. At the same time the contact 208 ohmically engages the conductive coating 200. Once both contacts 208 and 210 are engaged by the respective corresponding engaged region 195 and coating 200, the circuit assembly 194 begins transmission. Electrical continuity is provided by the shank 197 at region 195 from contact 210 to the head 204 to the conductive layer 200 ohmically connected to the head 204 electrically conductive region. This connects contacts 208 and 210.

The tapered region 187 assists in insertion of the bolt into the housing sub-chamber corresponding to sub-chamber 64. This provides a tight interference friction fit between the layer 202 and the housing corresponding to housing 48 providing moisture sealing therebetween. Only the bolt portion with the layer 202 extends beyond the housing. The coating 198 insulates the coating 200 from engaging the shank except at the head 204 where there is no coating 198.

Should the shank 197 be severed in an attempt to open the seal, this breaks the circuit supplying power to the transmission circuit. This interruption of power, even if momentary, results in a tamper signal being generated and transmitted as discussed above.

Figure 20:
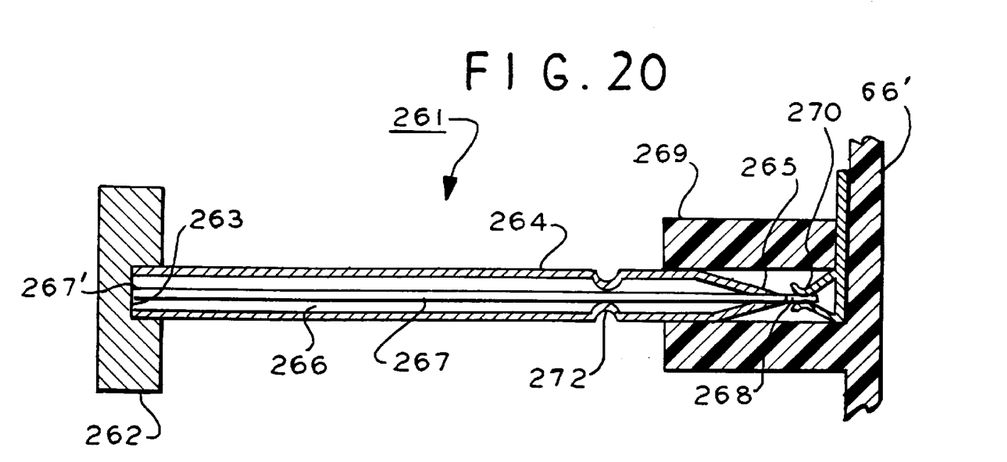
FIG. 20 is a side elevation sectional view of a bolt according to a further embodiment.

In a further alternative embodiment, a bolt 261, FIG. 20, includes a metal head 262, which may be of any shape such as a disk and so on, having a circular cylindrical recess 263. A metal tube 264 which is steel or stainless steel or other hard tough metal is welded or otherwise permanently fastened to the head 262 in the recess 263 such as by swaging and so on. The end of the tube 264 is tapered in a frustoconical tip 265. The tip 265 has a reduced diameter opening in communication with the tube hollow core 266.

A stiff insulated wire 267 of relatively heavy gauge, for example, having a diameter slightly smaller than the diameter of the tube core 266 is in the core 266. This and the other drawings are not to scale. The wire 267 has a bare uninsulated metal conductor 267' exposed at the head 262 end of the wire 267. Conductor 267' abuts the head in ohmic conductive contact therewith. The other end of the wire 267 passes through the reduced diameter opening in the tube tip 165 and may be held there by crushing the tip 265 end somewhat against the wire 267 insulation, crimping the wire thereto. A metal ring 268 is ohmically fastened to the wire 267 metal conductor at the exposed wire end such as by soldering and so on.

Figure 16:
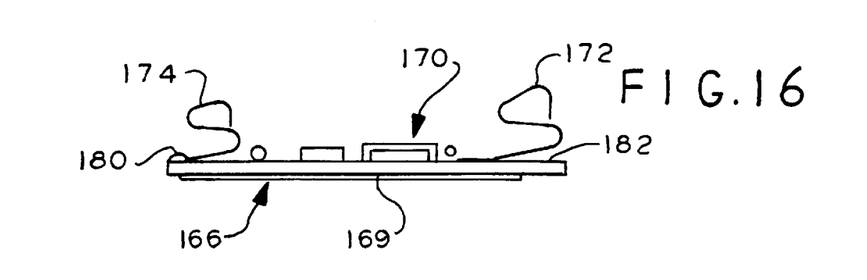
FIG. 16 is a side elevation view of the board of FIG. 15 taken along lines 15—15.

Wall 66' of the seal housing (see FIG. 1a, assembly 50) corresponds to the wall 66 of assembly 50. Tubular member 102, FIGS. 4 and 5 is replaced with a tubular member 269, FIG. 20, and which receives the tip end of the tube 264 and the ring 268. A contact 270 is attached to the wall 66' and located in the hollow core of the member 269. This contact replaces the contact 172, FIG. 16 of board 169, the board 169 circuit 170 otherwise being the same for use with the bolt 261. The contact 270 is connected similarly to the circuit 170 as contact 172. The tube 264 has a locking ring groove 272 for engagement with a locking body as discussed above in connection with FIGS. 5–7. In the alternative, the tube or bolts may have locking grooves for engagement with locking collets as known in the seal art such as shown in U.S. Pat. Nos. 5,450,657, 5,582,447, 5,413,393 and 5,347,689, all incorporated by reference herein.

In operation, should the head 262 be removed form the tube 264, the ohmic engagement of the wire 267 conductor 267' disengages ohmically from the head 262 and results in the generation of the tamper signal as discussed above. If the medial portion shaft of the tube 264 is severed the ohmic contact of the wire 267' to the head will be interrupted and result in a tamper signal. Any displacement of the head relative to the conductor 267' provides the same tamper signal result.

It will occur to one of ordinary skill that various modifications may be made to the disclosed embodiments given by way of example and not limitation. It is intended that the scope of the invention be defined by the appended claims. For example, the locking mechanisms, the power source, the bolt configuration, the information stored and transmitted, the use of a movable door and a transparent housing may be changed according to a given implementation. In place of a door locked by the inserted bolt, the end wall assembly may include locking devices for permanently locking the assembly to the housing without a door. The antenna may be attached to the housing rather than the circuit board. The serial number may be attached to the housing rather than the circuit board. The contact arrangements may differ from the disclosed embodiments.

In the alternative, an elongated insulating member such as a rod or coating layer of any cross section shape in place of the tube or coating disclosed may be used for forming a key along the shank, the housing having a mating keyway for receiving the key. One or more conductors are located within or adjacent to the insulating member and make ohmic contact with the bolt at the bolt head and/or at other spaced locations along the shank, each location forming a completed separate power supply circuit with the control means. Momentary separation of the bolt from the contacts or severing the bolt so that there is interruption of the signal to the signal sensing portion of the circuit causes the generation of a tamper signal. The tamper signal may comprise any suitable signal recognized as a tampered condition and transmission of the word "tamper" is given by way of illustration.

What is claimed is:

1. An electronic seal comprising:
   a housing having a cavity;
   an electrically conductive bolt having an elongated shank and a head;
   signal generating means in the cavity;
   a first electrically insulating layer over at least a portion of the shank;
   an electrically conductive layer over at least a portion of the insulting layer and at least a portion of the electrically conductive layer in ohmic contact with the head forming a continuous electrical conductor with the bolt;
   bolt locking means in the cavity for receiving and locking the shank to the housing; and
   circuit means in the cavity responsive to the received locked shank in ohmic contact with the shank and with the electrically conductive layer, the conductive layer and shank completing an electrical circuit with the circuit means to cause the signal generating means to generate a first signal manifesting a first code and a locked seal and a second signal manifesting a second code and a tampered condition when the shank is severed.

2. The seal of claim 1 further including a second electrically insulating layer over at a portion of the electrically conductive layer over the shank.

3. The seal of claim 2 wherein the second electrically insulating layer extends over and completely covers the electrically conductive layer on said head.

4. The seal of claim 1 wherein the second insulating layer has an interface with the housing for moisture sealing the interface.

5. The seal of claim 1 wherein said housing includes an opening for receiving means for programming said circuit means with seal identifying data, said housing including a door for selectively closing the opening, said door including a bolt receiving recess for locking the door closed in response to said received locked shank engaged with said recess.

6. The seal of claim 1 wherein said circuit means includes contact means for engaging said received locked shank for electrically coupling an electrical power source to the shank and electrically conductive layer.

7. The seal of claim 1 wherein the circuit means includes transmitting means for transmitting the first and second signals.

8. The seal of claim 1 wherein the bolt locking means comprises a body secured in the cavity, a recess in the body and a ring segment in the recess, the shank including a groove for engaging the ring segment for locking the shank to the body.

9. The seal of claim 1 wherein the circuit means includes sense means for causing said second signal to be generated upon sensing interruption of said continuous electrical conductor.

10. The seal of claim 6 wherein said contact means comprises a support, a first contact on the support and a resilient second contact secured to the support releaseably engaged with the received shank and ohmically connected to the first contact.

11. The seal of claim 10 wherein the second contact is serpentine.

12. The seal of claim 10 wherein the second contact is S-shaped.

13. The seal of claim 1 wherein the circuit means includes an electrical circuit comprising a first contact for ohmically engaging the shank and a second contact for ohmically engaging said conductive layer, means for applying electrical power from a source to said circuit means through the bolt and electrically conductive layer for activating the circuit means, the interruption of the electrical circuit for causing the circuit means to generate said second code.

14. The seal of claim 1 further including transmission means and receiver means, said receiver means including means response to an interrogation signal for causing said transmission means to transmit said first or second codes.

15. The seal of claim 1 including transmission means for transmitting said first or second signals.

16. The seal of claim 15 including means responsive to an applied input signal for causing the transmission of said first and second signals.

17. An electronic seal comprising:
   a housing having a cavity;
   an electrically conductive bolt having a shank and a head;
   a locking mechanism fixed in the cavity for receiving and locking the received shank in the cavity;
   an electrically conductive layer extending over and along the received shank electrically insulated from the shank and located within and externally the housing;
   a circuit in the cavity ohmically coupled to the conductive layer and to the shank for generating a first code signal manifesting a locked state of the bolt and for generating a second code signal manifesting a tampered state of the bolt upon severance of at least one of the conductive layer and shank; and
   a transmitter in the cavity responsive to the code signals for transmitting a signal manifesting the codes.

18. The seal of claim 17 including a door secured to said housing for enclosing an opening to the cavity, said circuit including means responsive to programming means inserted through said opening for causing said circuit to generate a seal identifying code included in said first and second codes, and a locking arrangement for locking the door shut upon the locking of said received shank.

19. The seal of claim 17 including a contact responsive to the received shank for applying an energizing signal to said circuit and activating the transmitter.

20. The seal of claim 17 including a battery in said cavity for supplying electrical power to said circuit and transmitter.

21. In a seal comprising a housing, a locking body and a circuit for transmitting the normal or tampered state of the seal when a locking bolt electrically coupled to the circuit used with the seal is tampered with, the locking bolt comprising:

an elongated metal electrically conductive member having a shank for locking engagement with the locking body and an enlarged head at one end of the shank, the shank for engaging a first circuit contact;

an electrical insulating coating over the shank; and a metal electrically conductive coating over the insulating coating for ohmic connection to a second circuit contact, the conductive coating in ohmic contact with the head such that the shank and coating form a continuous electrical conductor.

22. An electronic seal comprising:

a housing having a cavity;

a bolt having an elongated shank and a head;

signal generating means in the cavity;

bolt locking means in the cavity for receiving and locking the shank to the housing; and circuit means in the cavity responsive to the received locked shank for causing the signal generating means to generate a first signal manifesting a first code and a locked seal and a second signal manifesting a second code and a tampered condition when the shank is severed;

said housing having an opening for receiving means for programming said circuit means with seal identifying data, said housing including a door for selectively closing the opening, said door including a bolt receiving recess for locking the door closed in response to said received locked shank engaged with said recess.

* * * * *